(12) United States Patent
Wang

(10) Patent No.: US 6,381,067 B1
(45) Date of Patent: Apr. 30, 2002

(54) TELESCOPE WITH REARVIEW MIRROR

(76) Inventor: Yanlai Wang, c/o Kungming YingPai Co., Liangyuanwushe, Liangjiahe, Xishan District, Kunming, Yunnan Province 650106 (CN)

( * ) Notice: Subject to any disclaimer, the term of this patent is extended or adjusted under 35 U.S.C. 154(b) by 0 days.

(21) Appl. No.: 09/676,306

(22) Filed: Sep. 29, 2000

(30) Foreign Application Priority Data

Oct. 15, 1999 (CN) ........................................ 99241329 U

(51) Int. Cl.⁷ ............................................... G02B 23/00
(52) U.S. Cl. ........................ 359/407; 359/406; 359/879
(58) Field of Search .................... 359/399–409, 359/429–431, 478–482, 507–508, 511–514, 600, 611; 351/47, 50, 158, 121

(56) References Cited

U.S. PATENT DOCUMENTS

| | | | | | |
|---|---|---|---|---|---|
| 450,409 | A | * | 4/1891 | Green | 359/407 |
| 498,019 | A | * | 5/1893 | Murray | 359/407 |
| 4,349,246 | A | * | 9/1982 | Binner | 351/50 |
| 5,479,293 | A | * | 12/1995 | Reed | 359/432 |

* cited by examiner

*Primary Examiner*—Thong Nguyen
(74) *Attorney, Agent, or Firm*—Merchant & Gould P.C.

(57) ABSTRACT

A telescope is provided with a rearview mirror having a mirror surface opposite to the observer. The rearview mirror is located on both sides of the eyepiece, the objective lens, or the telescope body and can be rotatably attached, insertably attached, clipped, or fastened. The rearview mirror is parallel to or tilting to the lens of the eyepiece. The objective lens can be circular, square, or any other shape.

1 Claim, 2 Drawing Sheets

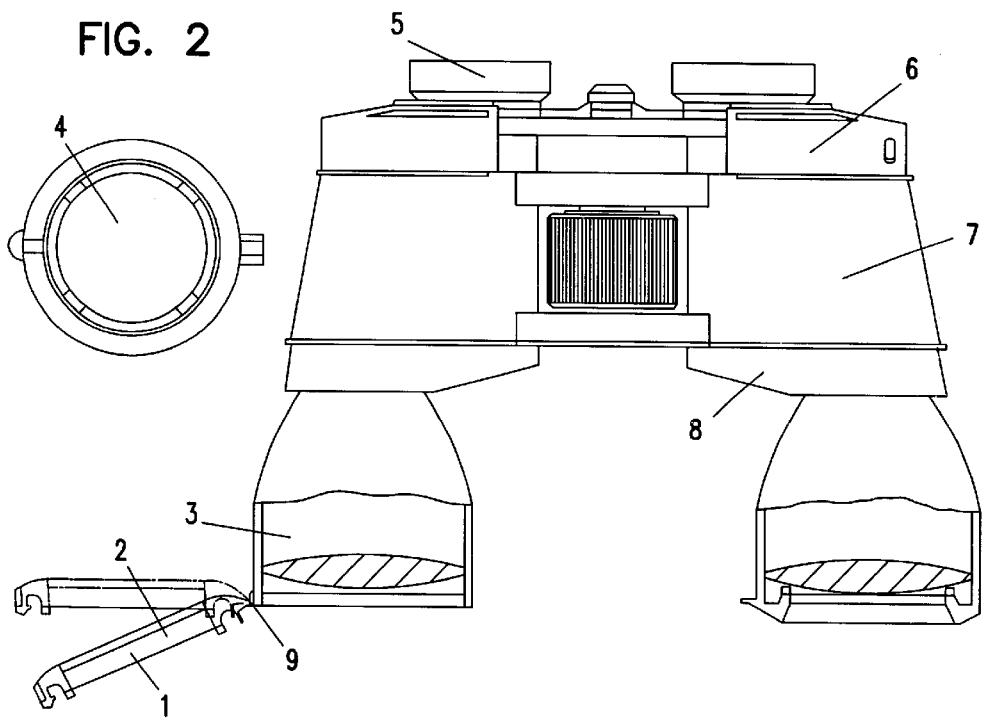
FIG. 1
FIG. 2
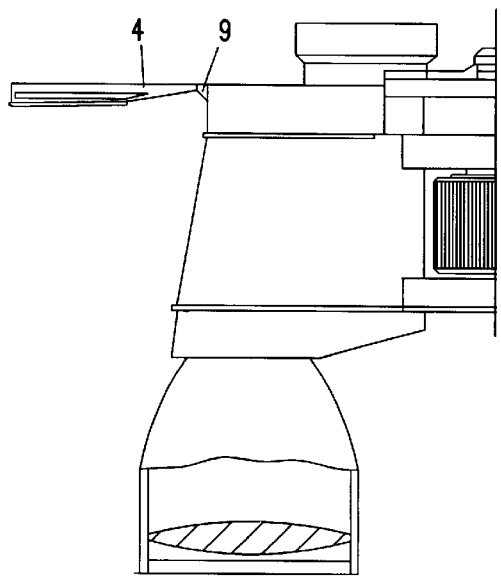
FIG. 3
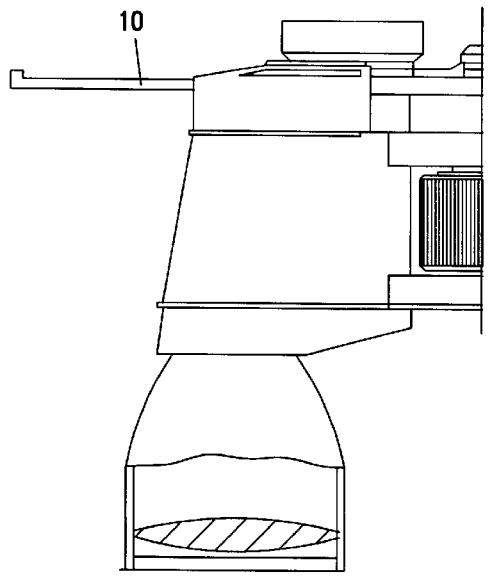
FIG. 4

FIG. 5
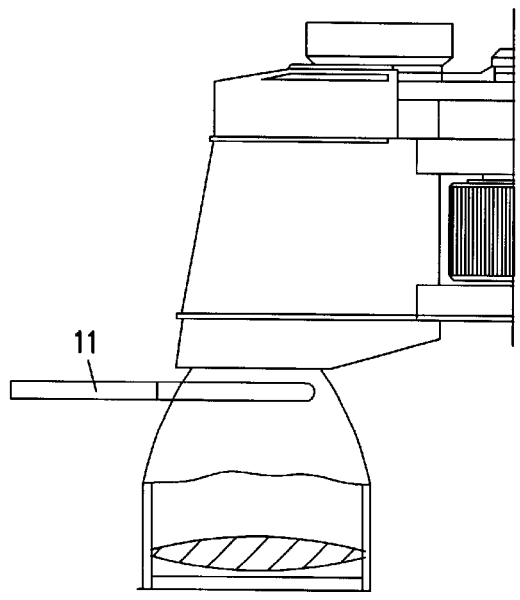
FIG. 7
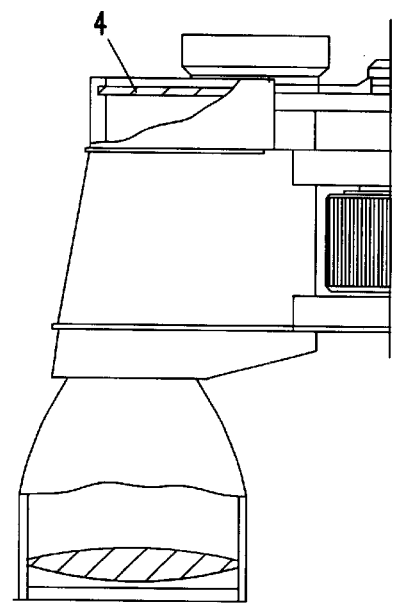
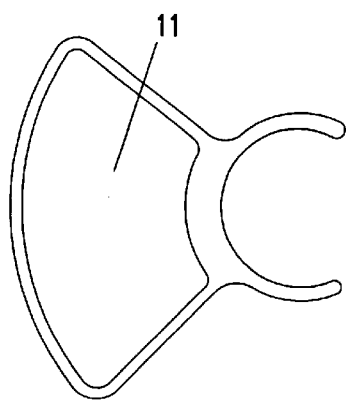
FIG. 6

TELESCOPE WITH REARVIEW MIRROR

TECHNICAL FIELD OF THE INVENTION

The present invention relates to a telescope and more particularly to a telescope with a rearview mirror.

BACKGROUND OF THE INVENTION

Nowadays, the telescope has entered into our usual life from the military field. Moreover, the telescope will have increasing functions to satisfy the people's different requirements.

SUMMARY OF THE INVENTION

The object of the present invention is to provide a telescope with a rearview mirror which has a function to view backward, a novel structure as well as in different modes, and also can be carried easily.

To achieve the object mentioned above, according to one aspect of the present invention, there is provided a telescope, wherein the telescope is provided with a rearview mirror having a mirror surface opposite to the observer. Preferably, the rearview mirror is located on one side of the eyepiece, the objective lens, or the telescope body. And the rearview mirror being parallel to or tilting to the lens of the eyepiece and the objective lens is constructed to be circular, square, or any other shape, and also being attached in a rotated way, an inserted way, a clipped way, or a fastened way.

Preferably, the rearview mirror is attached to the eyepiece, the objective lens, the upper cover plate, or the lower cover plate by a hinge, the shape of the rearview mirror is adapted to that of the objective lens, the upper cover plate, or the lower cover plate.

Preferably, the rearview mirror is detachably attached to the eyepiece, the objective lens, or the telescope body by means of a clip. Preferably, a slot is formed on one side of the upper cover plate and /or the lower cover plate, through which the rearview mirror can be inserted into or drawn out of and being fastened to the upper cover plate and /or the lower cover plate.

Preferably, the rearview mirror is fastened to the top surface of the upper cover plate.

Preferably, the lens of the rearview mirror is planar or non-planar.

The object of the present invention will be achieved by the above technical scheme.

The rearview mirror is attached to the eyepiece, the objective lens, or the telescope body by means of a hinge, a clip or an insert, by which the observer can view backward.

In the way that the rearview mirror is attached to the eyepiece, the objective lens, an upper cover plate, or a lower cover plate by a hinge, it allows the rearview mirror to be parallel to or tilt to the lens due to the position limitation by the hinge. Tilting to the lens can spread an observation scope. The rearview mirror attached to the eyepiece or the objective lens can also serve as a protective cover for the lenses. If the lens of the rearview mirror is made of a transparent color material and its outside surface is coated with a reflector-film, it shall serve as a light barrier for the lenses as well.

A slot is formed on one side of the upper cover plate and/or the lower cover-plate of the telescope body, into which the rearview mirror can be inserted and being concealed. The rearview mirror will be drawn out of the slot while being used.

When the attachment is by the clip, it is fastened to the eyepiece, the objective, or the telescope body by utilizing the elastic deformation of the clip material.

By which there is no need to make any change to the original telescope and being suitable for any other telescopes, this can add a new function to the original telescope and has the decoration. The rearview mirror may be circular, square, or any other shape having aesthetic feelings.

The telescope of this invention has a novel structure and has different ways. While observing the front, the observer can also observe backward, additionally, the telescope can be carried easily, owning to all these reasons, it is a kind of telescope which the new function is added.

BRIEF DESCRIPTION OF THE DRAWINGS

The invention will be described below in detail with reference to the accompanying drawings, in which:

FIG. 1 is a front view of a telescope, in which the rearview mirror is attached to the objective lens by a hinge;

FIG. 2 is a schematic view of the rearview mirror;

FIG. 3 is a schematic view of a telescope, in which the rearview mirror is attached to the upper cover plate of the telescope body by a hinge;

FIG. 4 is a schematic view of a telescope in which the rearview mirror is attached by the insert;

FIG. 5 is a schematic view of a telescope in which the rearview mirror is attached by the clip;

FIG. 6 is a schematic view of the rearview mirror which is attached in the clip way;

FIG. 7 is a schematic view of a telescope, in which the rearview mirror is directly attached to the top surface of the upper cover plate of the telescope body.

DESCRIPTION OF THE PREFERRED EMBODIMENT

Referring to FIG. 1 to FIG. 7, 1 is a tilted rearview mirror, 3 is an objective lens, 4 is a rearview mirror, 5 is an eyepiece, 6 is an upper cover plate, 7 is a telescope body, 8 is a lower cover plate, 9 is a hinge, 10 is an inserted type of rearview mirror, and 11 is a clipped-type rearview mirror.

Embodiment 1 describes a telescope, in which the rearview mirror is attached to the objective lens by a hinge.

As shown in FIG. 1, a frame formed as a circular cover of the rearview mirror is attached to the both sides of the front end of the objective lens of the telescope. A positioning block is provided on the hinge to allow the frame in a horizontal position or a tilting position. The lens of the rearview mirror is made of a transparent yellow organic material, and its outside surface is coated with a reflector-film. While being used, the rearview mirror is opened to a horizontal position or a tilting position otherwise, the frame is closed to the front end of the object lens so as to protect the objective lens. The transparent yellow organic material can also serve as a light barrier.

Embodiment 2 describes a telescope, in which the rearview mirror is attached to the upper cover plate or the lower cover plate of the telescope body by a hinge.

As shown in FIG. 3, the upper cover plate or the lower cover plate of the telescope body is formed into a plane, on one side of which provides the hinge. The profile of lens and the frame of the rearview mirror are adapted to that of the upper cover plate or the lower cover plate. The mirror surface is located on the surface upward. When closing the rearview mirror, the whole profile is the same as that of the original telescope and the mirror surface is protected from exposing to outside.

The lens of the rearview mirror may also be concealed underneath of the upper cover plate or the lower cover plate. A hinge axis parallel to the axis of the eyepiece is mounted on one side of the cover plates. One side of the lens of the rearview mirror connected to the hinge axis is rotated about the hinge axis. While being used, the rearview mirror can be moved into or drawn out of the back of the upper cover plate by hand, which can also be ejected by means of a spring mechanism. Additionally, a gear engaged with a toggle wheel can be provided on the hinge axis. One side of the toggle wheel exposes to the upper cover plate. While in use, the rearview mirror will be drawn out as the toggle wheel is rotated.

Embodiment 3 describes a telescope in which the rearview mirror is attached on the upper cover or the lower cover by the insert.

As shown in FIG. 4, a slot is formed on one side of the upper cover plate or the lower cover plate of the telescope body, the width of which is wider than the depth of the lens so that the rearview mirror can be easily moved in the slot. In manufacturing, a plate is placed between the chamber of the rearview mirror and that of a prism. The chambers are sealed. The profile of the insert-type rearview mirror is adapted to that of the cover plate of the telescope body. Its outside end is provided with an edge deeper than the width of the slot so as to prevent the rearview mirror from falling into the chamber of the rearview mirror.

Embodiment 4 describes a telescope, in which the rearview mirror is directly attached to the top surface of the upper cover of the telescope body.

As shown in FIG. 7, the top surface of the upper cover of the telescope body is formed into a plane on which the rearview mirror is fixed by glue. The profile of the rearview mirror is adapted to that of the top surface of the upper cover.

Embodiment 5 describes a telescope with a clip-type rearview mirror.

As shown in FIG. 6, a mirror frame of the rearview mirror is made of engineering plastics or an organic glass. The profile of the clip is adapted to that of the eyepiece, the objective, or both sides of the telescope body. The lens is fastened to the mirror frame, the shape of which can be any form.

What is claimed is:

1. A telescope with a rearview mirror comprising:
    a telescope body including an upper cover plate, a lower cover plate, and a slot being formed on one side of said upper cover plate or said lower cover plate; and
    a rearview mirror insertable into said slot of said telescope body; wherein said rearview mirror can be moved into, or drawn out of said slot, and is fastenable to said upper cover plate or said lower cover plate.

* * * * *